United States Patent [19]
Kato

[11] Patent Number: 5,323,264
[45] Date of Patent: Jun. 21, 1994

[54] REAL IMAGE MODE VARIABLE MAGNIFICATION FINDER OPTICAL SYSTEM

[75] Inventor: Shigeru Kato, Machida, Japan

[73] Assignee: Olympus Optical Co., Ltd., Tokyo, Japan

[21] Appl. No.: 929,919

[22] Filed: Aug. 17, 1992

[30] Foreign Application Priority Data

Aug. 23, 1991 [JP] Japan .................. 3-212131

[51] Int. Cl.$^5$ ............... G02B 15/177; G02B 23/14; G02B 23/02; G03B 13/12
[52] U.S. Cl. ................... 359/432; 359/431; 359/689; 354/222; 354/225
[58] Field of Search ........... 359/399, 421, 422, 423, 359/431, 434, 730, 834, 835, 682, 684, 689; 354/219, 222, 225

[56] References Cited

U.S. PATENT DOCUMENTS

| | | | |
|---|---|---|---|
| 4,757,336 | 7/1988 | Nakayama et al. | 359/689 X |
| 4,779,969 | 10/1988 | Sato et al. | |
| 4,812,023 | 3/1989 | Kikuchi | 359/689 |
| 4,842,395 | 6/1989 | Sato et al. | |
| 4,854,680 | 8/1989 | Kikuchi | 359/689 |
| 5,231,534 | 7/1993 | Kato | 359/432 |

FOREIGN PATENT DOCUMENTS

| | | | |
|---|---|---|---|
| 61-156017 | 7/1986 | Japan | 354/219 |
| 61-156018 | 7/1986 | Japan . | |
| 64-65519 | 3/1989 | Japan . | |
| 1309020 | 12/1989 | Japan . | |
| 34217 | 1/1991 | Japan . | |
| 3-236051 | 10/1991 | Japan | 354/225 |
| 4-30112 | 2/1992 | Japan | 359/689 |
| 4-230719 | 8/1992 | Japan | 359/689 |

*Primary Examiner*—William L. Sikes
*Assistant Examiner*—David R. Parsons
*Attorney, Agent, or Firm*—Cushman, Darby & Cushman

[57] ABSTRACT

A real image mode variable magnification finder optical system has an objective lens system including a first lens unit of negative refracting power, a second lens unit of positive refracting power, and a third lens unit of negative refracting power, provided with positive refracting power as a whole; and image erecting system for erecting an image of an object; and an eyepiece system for observing the erected image, in which the first and second lens units are moved and the third lens unit is fixed to vary magnification. Thus, the finder optical system has important advantages in practical use that its overall length is reduced, aberrations are favorably corrected, and manufacturing costs are low.

5 Claims, 13 Drawing Sheets

FIG. 4A  LOW MAGNIFICATION
FIG. 4B  MODERATE MAGNIFICATION
FIG. 4C  HIGH MAGNIFICATION

FIG. 5

LOW MAGNIFICATION

| SPHERICAL ABERRATION | ASTIGMATISM | DISTORTION |
|---|---|---|
| PUPIL DIAMETER=2mm | $\omega=26.5°$ | $\omega=26.5°$ |

FIG. 6

MODERATE MAGNIFICATION

| SPHERICAL ABERRATION | ASTIGMATISM | DISTORTION |
|---|---|---|
| PUPIL DIAMETER=2mm | $\omega=19.8°$ | $\omega=19.8°$ |

HIGH MAGNIFICATION

SPHERICAL ABERRATION
PUPIL DIAMETER=2mm
-2.0   2.0
(DIOPTER)

ASTIGMATISM
ω=9.1°
-2.0   2.0
(DIOPTER)

DISTORTION
ω=9.1°
-10.   10.
(%)

FIG. 19

LOW MAGNIFICATION

SPHERICAL ABERRATION
PUPIL DIAMETER=2mm
-2.0   2.0
(DIOPTER)

ASTIGMATISM
ω=25.3°
-2.0   2.0
(DIOPTER)

DISTORTION
ω=25.3°
-10.   10.
(%)

MODERATE MAGNIFICATION

SPHERICAL ABERRATION
PUPIL DIAMETER=2mm
-2.0 — 2.0 (DIOPTER)

ASTIGMATISM
$\omega = 20.5°$
-2.0 — 2.0 (DIOPTER)

DISTORTION
$\omega = 20.5°$
-10. — 10. (%)

FIG. 21

HIGH MAGNIFICATION

SPHERICAL ABERRATION
PUPIL DIAMETER=2mm
-2.0 — 2.0 (DIOPTER)

ASTIGMATISM
$\omega = 17.3°$
-2.0 — 2.0 (DIOPTER)

DISTORTION
$\omega = 17.3°$
-10. — 10. (%)

REAL IMAGE MODE VARIABLE MAGNIFICATION FINDER OPTICAL SYSTEM

BACKGROUND OF THE INVENTION a) Field of the Invention

This invention relates to a real image mode variable magnification finder optical system for use in photographic cameras, video cameras, etc.

b) Description of the Prior Art

For the finder optical system in which a photographing system is disposed separate from a finder system, an inverse Galilean filter is well known. This finder optical system, however, has drawbacks that its field frame is unclearly viewed and the visual field itself cannot be sufficiently observed due to ghost and flare produced at a half mirror for forming the field frame.

Figure 1:
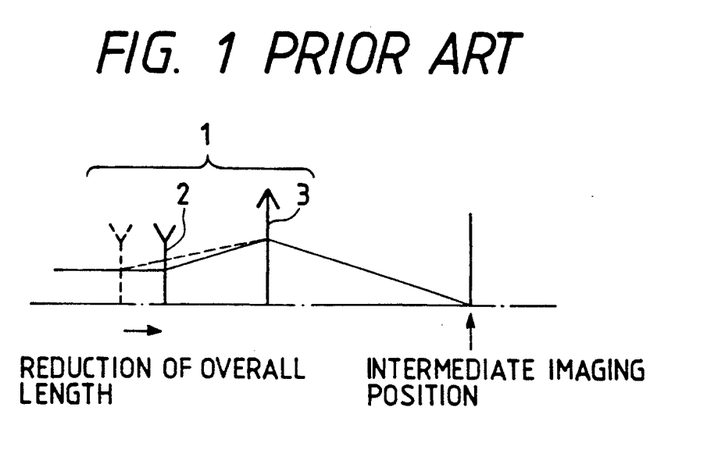
FIG. 1 is a conceptional view showing an objective lens system in a real image mode variable magnification finder optical system of prior art.

In contrast to this, a Keplerian finder optical system is such that since a real image formed by an objective lens system is observed through an eyepiece system, the drawbacks of the inverse Galilean finder optical system are practically eliminated and the finder with a good view is brought about. A case where the Keplerian, namely, real image mode finder optical system possesses a function of varying magnification is shown in FIG. 1, which uses two units of zoom lenses as an objective lens system 1 comprising a first negative lens unit 2 and a second positive lens unit 3. The finder optical systems of the type are known from, for example, ones set forth in Japanese Patent Preliminary Publication Nos. Sho 61-156018, Sho 64-65519, and Hei 1-309020. In a real image mode variable magnification finder optical system, although an erect image system, such as a Porro prism or a pentagonal prism, is used to convert an observation image from an inverted image to an erect image, a method is known from the past that the reflecting member of the erect image system is divided and a part of the divided reflecting members is moved to the back focus of the objective lens system ranging from the last lens surface to the intermediate imaging position of the objective lens system to thereby include an intermediate image in the erect image system for reduction of the overall length of the finder optical system. To change the inverted image to the erect image, at least four-fold reflection is required, but the two-unit zoom lens type finder of negative and positive powers shown in FIG. 1 has a power arrangement of a retrofocus type, so that it is possible to dispose the reflecting member for once- or twice-reflection even at a low magnification position (wide angle) where the back focus is minimized.

In such a finder system, however, the refracting power of each lens unit must be increased in order to make shorter the overall length of the objective lens system while ensuring a long back focus in which the reflecting member can be disposed, with the resultant problem of increasing the yield of aberration in each lens unit. It is difficult that since spherical aberration and astigmatism produced at the second lens unit having positive power for varying magnification each increase on the minus side in particular, plus aberration is produced only by the first lens unit having negative refracting power for correcting a diopter shift caused by the magnification change, thereby improving the performance of the entire objective lens system.

SUMMARY OF THE INVENTION

It is, therefore, an object of the present invention to provide a real image mode variable magnification finder optical system in which the overall length of a finder section can be reduced and aberrations can also be advantageously corrected.

This object is accomplished, according to the present invention, by providing an objective lens system having positive refracting power as a whole, an image erecting system having a plurality of reflecting surfaces, for erecting an image of an object formed by the objective lens system, and an eyepiece system having positive refracting power, for observing the erected image.

In the optical system according to the present invention, the objective lens system includes a first lens unit of negative refracting power, a second lens unit of positive refracting power, and a third lens unit of negative refracting power, in which the first and second lens units or only the second lens unit is moved and the third lens unit is fixed to vary magnification. Thus, the overall length of the finder optical system can be reduced and aberrations can be favorably corrected.

This and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Figure 2:
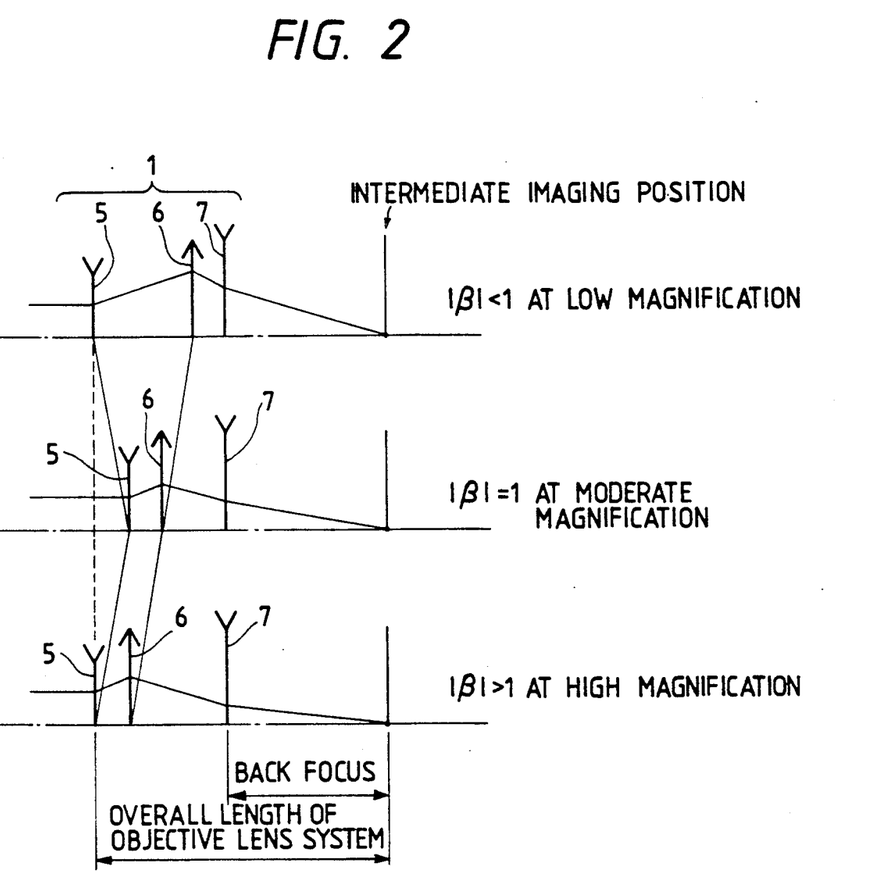
FIG. 2 is conceptional views showing an objective lens system at low, moderate, and high magnifications in a real image mode variable magnification finder optical system according to the present invention.

In accordance with the conceptional view of the objective lens system 1 shown in FIG. 2, prior to the description of the embodiments, the real image mode variable magnification finder optical system according to the present invention will be explained.

The real image mode variable magnification finder optical system according to the present invention is equipped with, in order from the object side, the objective lens system 1 having positive refracting power, an image erecting system including a plurality of reflecting members for erecting an intermediate image formed by the objective lens system 1, and an eyepiece system having positive refracting power, in which the objective lens system 1 comprises a first lens unit 5 having negative refracting power, a second lens unit 6 having positive refracting power, and a third lens unit 7 having negative refracting power, and when magnification is varied, the third lens unit 7 is fixed with respect to the direction of the optical axis and the second lens unit 6 is capable of moving in the direction of the optical axis.

In the optical system of the present invention, magnification is varied from low (a wide angle) to high (a tele angle) by moving the second lens unit 6 of the objective lens system 1, namely, by shifting the second lens unit 6 toward an object. The shift of the intermediate imaging position (diopter shift) caused in varying magnification is corrected by the movement of the first lens unit 5. Also, if a variable magnification ratio is relatively low, the amount of diopter shift will be small, so that there is no problem in practical use even though the first lens unit 5 remains fixed. Thus, it is possible to reduce the number of moving lens units, with the result that the optical system can be designed for a smaller number of driving mechanism parts, further downsizing, and lower cost.

If the refracting powers of the first and second lens units 5 and 6 are increased while the back focus of the objective lens system 1 is maintained at a constant distance, the retrofocus type will be developed and the entire length of the objective lens system 1 can be reduced. In such an instance, since spherical aberration and astigmatism produced at the second lens unit 6 having positive refracting power each increase on the minus side, the surface of the third lens unit 7 having negative refracting power yields plus aberration, thereby canceling each aberration to acquire favorable optical properties as the entire objective lens system. Further, since the third lens unit 7 has negative refracting power as a whole, the positive refracting power of the second lens unit 6 will be more enhanced in order to make constant the paraxial conditions (field angle and focal length). The settings of the constant field angle and focal length make it possible to minimize the amount of movement of the second lens unit 6, so that the first lens unit 5 can be disposed close to the intermediate imaging position with the resultant reduced length of the objective lens system.

Next, based on the foregoing principle, reference is made to a condition for securing the variable magnification finder optical system having favorable optical properties in which the production of aberrations is suppressed. In connection with the above explanation, when the refracting power of the third lens unit 7 is extremely increased, that of the second lens unit 6 must be further enhanced and consequently, aberrations are largely produced and difficult of correction. Hence, it is favorable for the refracting power of the third lens unit 7 to satisfy the condition $$0.7 < |f_3/f_T|$$

where $f_3$ is the focal length of the third lens unit 7 and $f_T$ is the focal length of the objective lens system 1 at high magnification.

If the lower limit of the condition is exceeded, each of spherical aberration and astigmatism will increase on the minus side and the optical performance will deteriorate. In order to diminish the overall length of the objective lens system in the whole range of the variation of magnification, it is desirable that a magnification $\beta_2$ of the second lens unit 6 is $|\beta_2|=1$ in the vicinity of the moderate magnification. That is, when $|\beta_2|=1$, the intermediate imaging position is shifted closest to the object. To correct this, the first lens unit 5 is moved closest to the intermediate imaging position. This situation thus shows the shortest length of the entire objective lens system.

Hence, the setting of $|\beta_2|=1$ in the vicinity of the moderate magnification makes it possible to give an extremum for the movement of the first lens unit 5 in varying magnification. Additionally, as shown in FIG. 2, it is possible to set the objective lens system so that its overall length at low and high magnification positions are much the same and to minimize the movement of the first lens unit 5 in the whole range of the variation of magnification. This serves for further reduction of the overall length of the objective lens system. The third lens unit 7 is fixed in varying magnification and hence, where the reflecting member disposed in the back focus section of the objective lens system is constructed of a prism, the prism can also be used as the third lens unit 7 by configuring the plane of incidence of the prism into a concave surface. Thus, at least one of lenses constituting the third lens unit 7 can be dispensed with, so that the cost and space can be reduced accordingly. Further, by using an aspherical surface in each lens unit, it is also possible to decrease the number of lenses for reduction of their arrangement length and further reduce the overall length of the objective lens system.

Referring to the embodiments shown, the present invention will be described in detail below.

Figure 3:
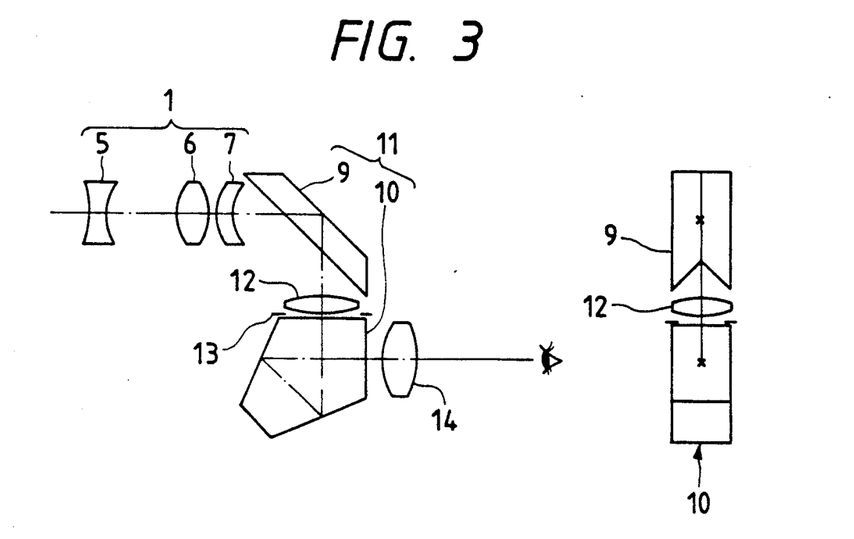
FIG. 3 is a view showing the arrangement of the finder optical system of a first embodiment in the present invention.
Figure 4A:
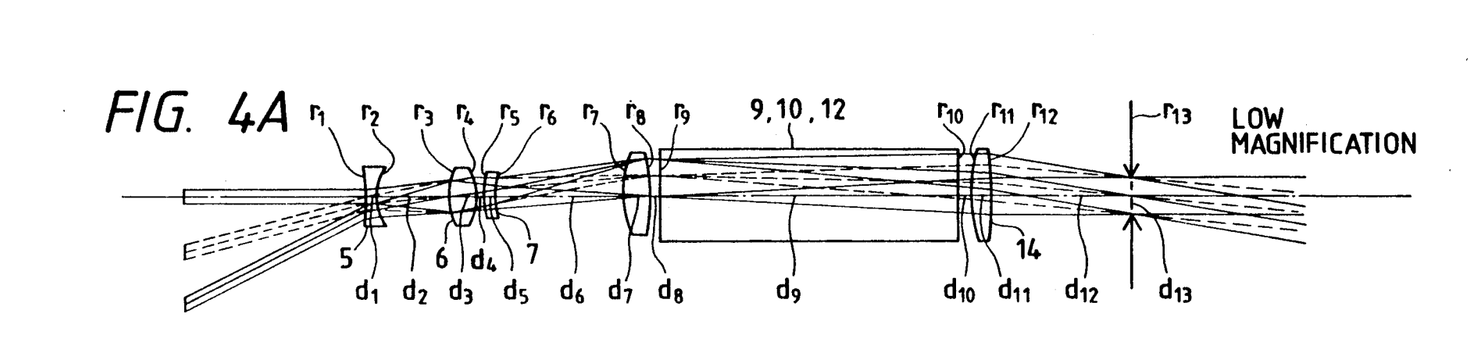
FIGS. 4A to 4C are developed views in the direction of the optical axis of the finder optical system in FIG. 3 at low, moderate, and high magnifications, respectively.
Figures 4B, 4C:
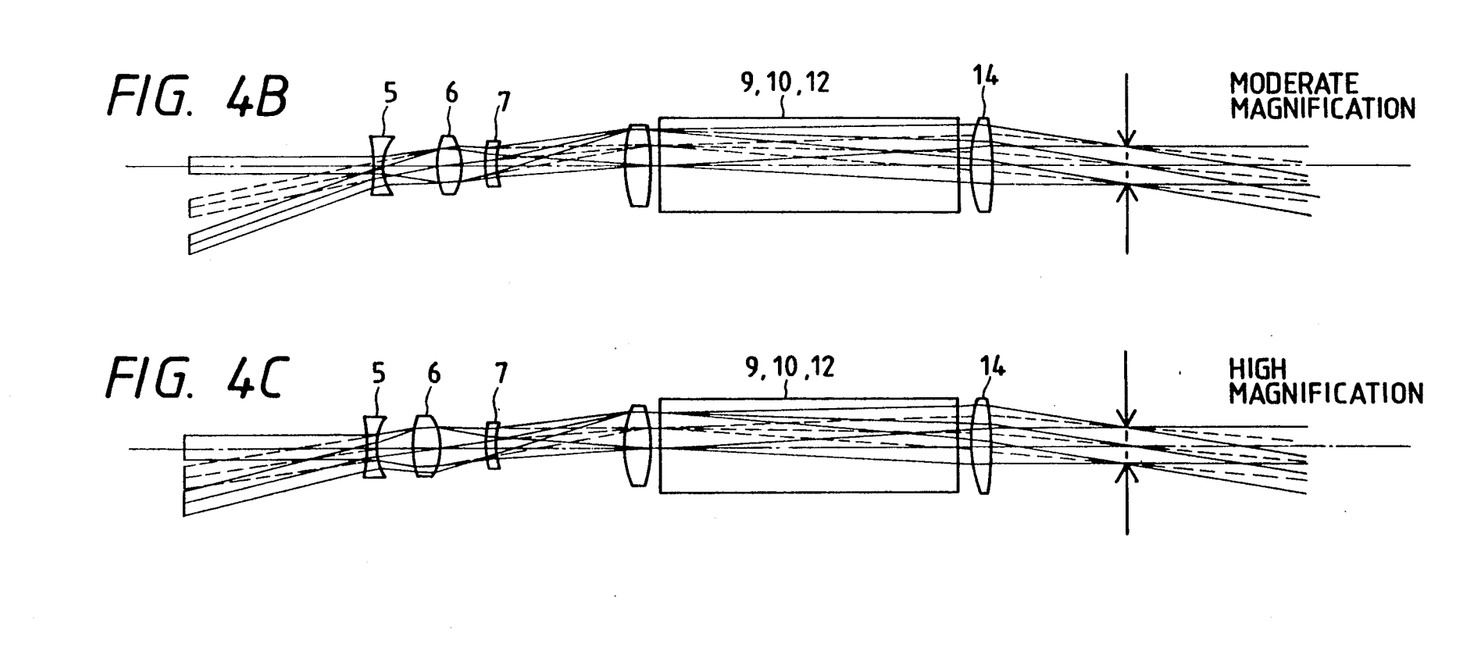
Figure 5:
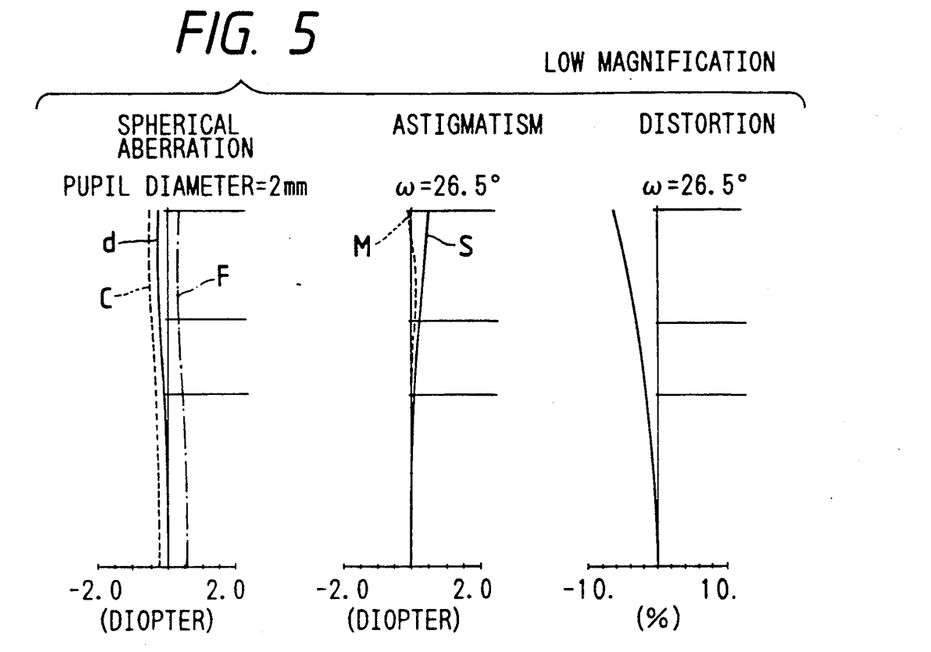
FIGS. 5 to 7 are diagrams showing aberration curves of the optical system of the first embodiment at low, moderate, and high magnifications, respectively.
Figure 6:
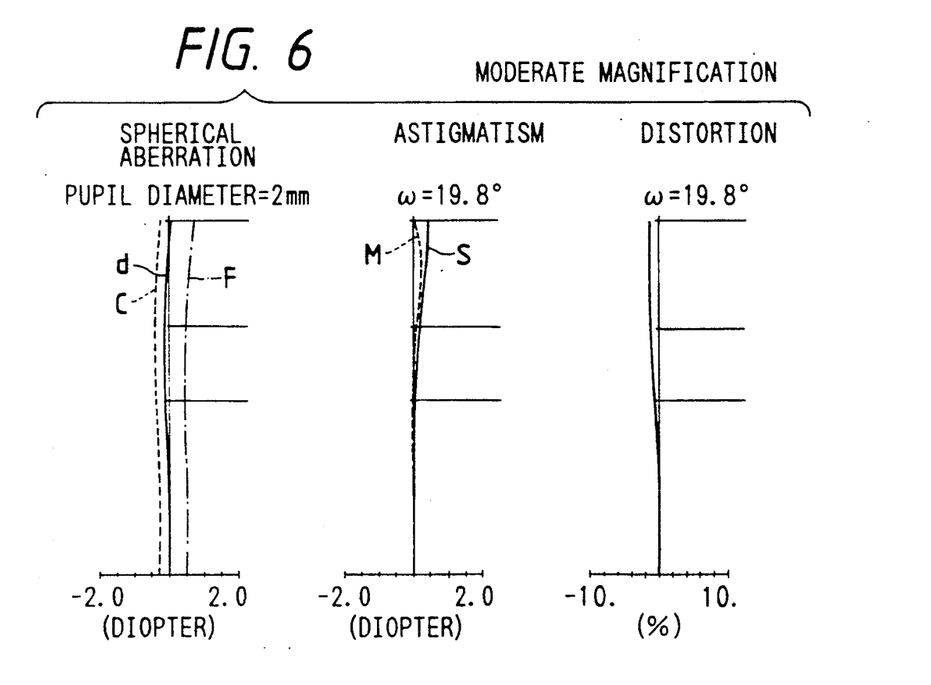
Figure 7:
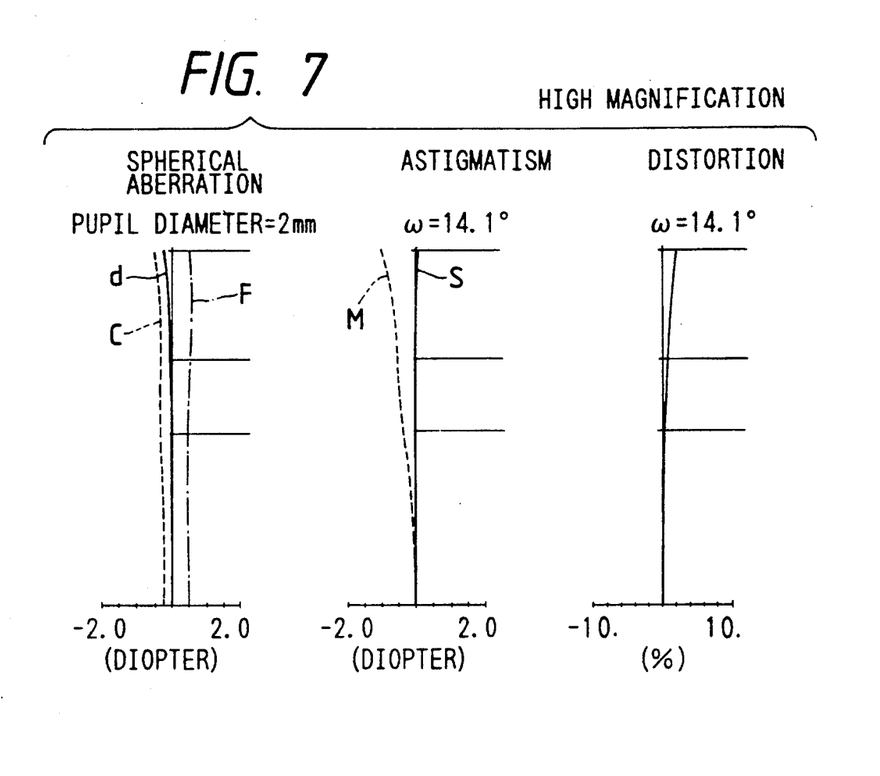

FIGS. 3 to 7 show a first embodiment of the present invention. In FIG. 3, the first movable lens unit 5 consisting of a negative lens, the second movable lens unit 6 of a positive lens, and the third lens unit 7 of a negative lens which is fixed in varying magnification are disposed, in order from the object side, to constitute the objective lens system 1. Behind these units, a Dach mirror 9 and a pentagonal prism 10 are disposed and constitutes an image erecting system 11 for converting the intermediate image formed by the objective lens system 1 into an erect image. A field lens 12 and a field frame 13 are located between the Dach prism 9 and the pentagonal prism 10, and a Lupe 14 having positive refracting power is provided behind the pentagonal prism 10 to constitute an eyepiece.

The numerical data of the first embodiment are as follows:

Finder magnification = 0.35~0.64
Field angle (2ω) = 52.9°~28.1°
$f_3/f_T = -1.12$
$r_1 = -23.4731$ -continued

| | | | |
|---|---|---|---|
| | $d_1 = 1.000$ | $n_1 = 1.58423$ | $\nu_1 = 30.49$ |
| $r_2 = 4.8006$ (aspherical) | | | |
| | $d_2 = D_1$ | | |
| $r_3 = 6.0446$ (aspherical) | | | |
| | $d_3 = 2.965$ | $n_2 = 1.49241$ | $\nu_2 = 57.66$ |
| $r_4 = -6.1606$ | | | |
| | $d_4 = D_2$ | | |
| $r_5 = 16.3537$ | | | |
| | $d_5 = 1.000$ | $n_3 = 1.58423$ | $\nu_3 = 30.49$ |
| $r_6 = 6.0935$ (aspherical) | | | |
| | $d_6 = 14.000$ | | |
| $r_7 = 11.8939$ | | | |
| | $d_7 = 2.806$ | $n_4 = 1.49241$ | $\nu_4 = 57.66$ |
| $r_8 = -22.1551$ | | | |
| | $d_8 = 1.000$ | | |
| $r_9 = \infty$ | | | |
| | $d_9 = 32.500$ | $n_5 = 1.49241$ | $\nu_5 = 57.66$ |
| $r_{10} = \infty$ | | | |
| | $d_{10} = 1.500$ | | |
| $r_{11} = 17.2118$ (aspherical) | | | |
| | $d_{11} = 2.004$ | $n_6 = 1.49241$ | $\nu_6 = 57.66$ |
| $r_{12} = -36.2612$ | | | |
| | $d_{12} = 15.000$ | | |
| $r_{13}$ (eyepoint) | | | |

Aspherical coefficients

Second surface
$A = -0.14081 \times 10^{-2}$, $B = 0.16586 \times 10^{-3}$,
$C = -0.11584 \times 10^{-4}$
Third surface
$A = -0.20058 \times 10^{-2}$, $B = 0.11270 \times 10^{-4}$,
$C = -0.21081 \times 10^{-5}$
Sixth surface
$A = 0.91304 \times 10^{-3}$, $B = 0.25504 \times 10^{-4}$,
$C = -0.34333 \times 10^{-5}$
Eleventh surface
$A = -0.90149 \times 10^{-4}$, $B = 0.33791 \times 10^{-5}$,
$C = -0.76166 \times 10^{-7}$ Zoom data

| | Low magnification | Moderate magnification | High magnification |
|---|---|---|---|
| $D_1$ | 8.035 | 5.837 | 3.871 |
| $D_2$ | 1.000 | 2.551 | 5.086 |
| $\beta_2$ | -0.732 | -0.961 | -1.34 |

Figure 8:
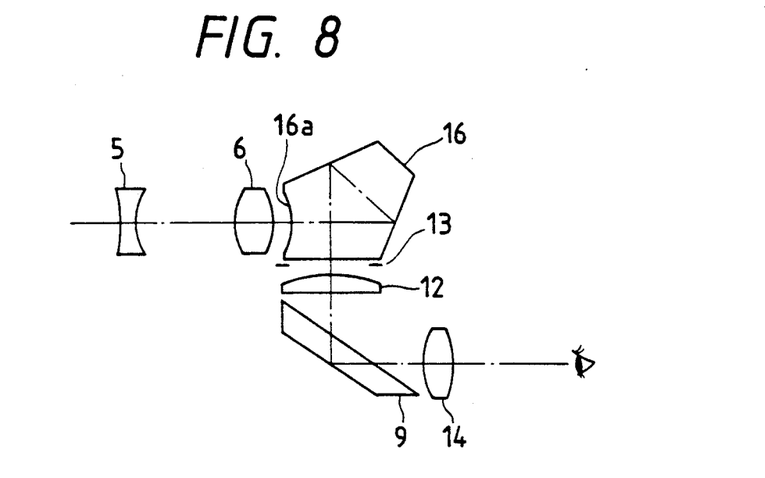
FIG. 8 is a view showing the arrangement of the finder optical system of a second embodiment.
Figure 9A:
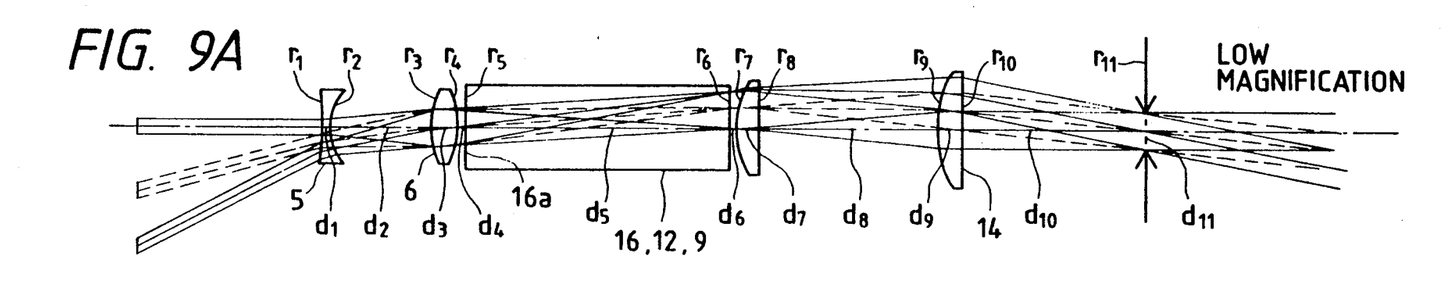
FIGS. 9A to 9C are developed views in the direction of the optical axis of the finder optical system in FIG. 8 at low, moderate, and high magnifications, respectively.
Figure 9B:
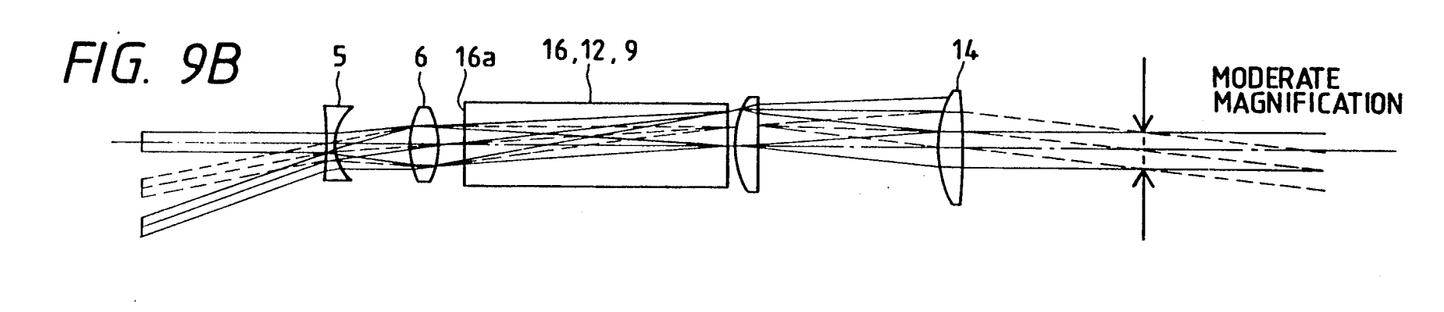
Figure 9C:
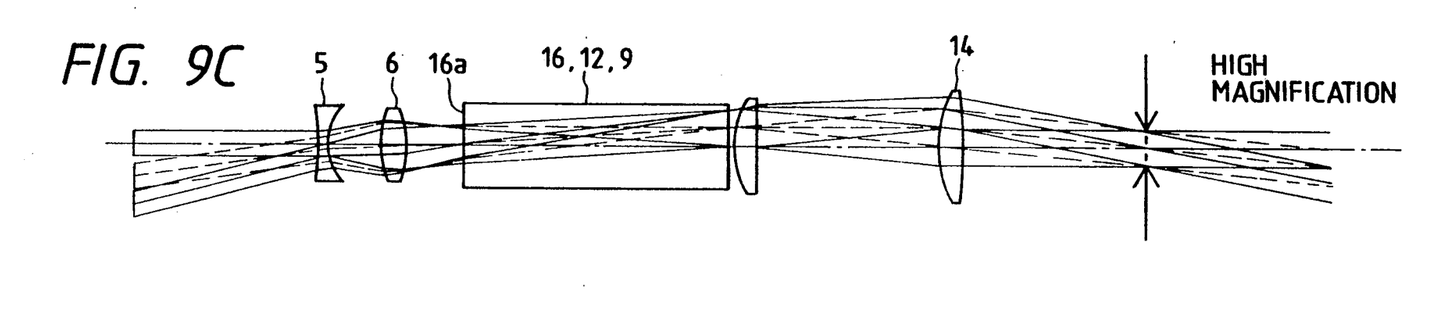
Figure 10:
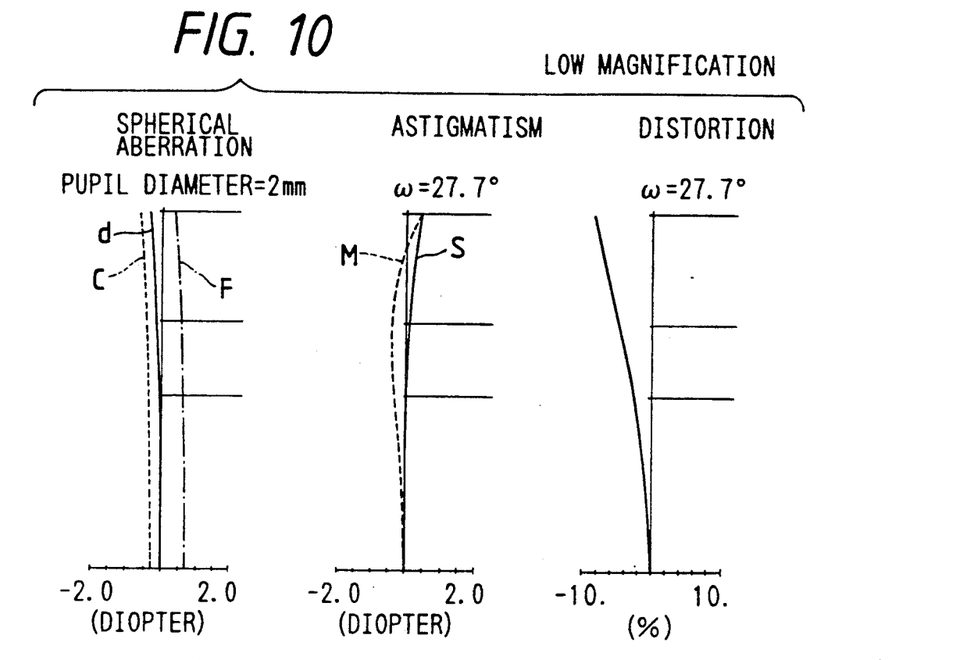
FIGS. 10 to 12 are diagrams showing aberration curves of the optical system of the second embodiment at low, moderate, and high magnifications, respectively.
Figure 11:
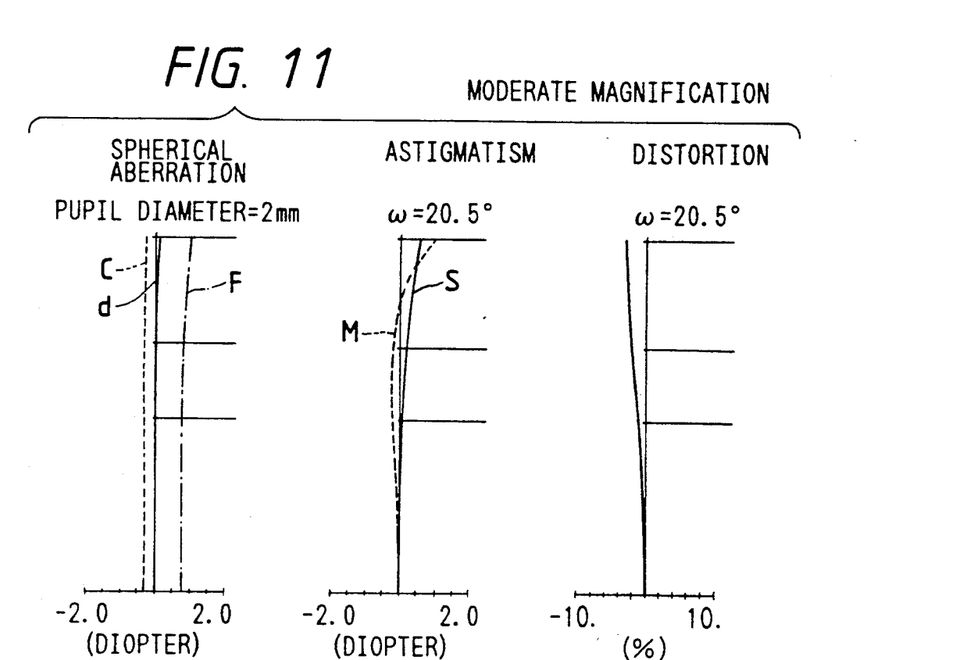
Figure 12:
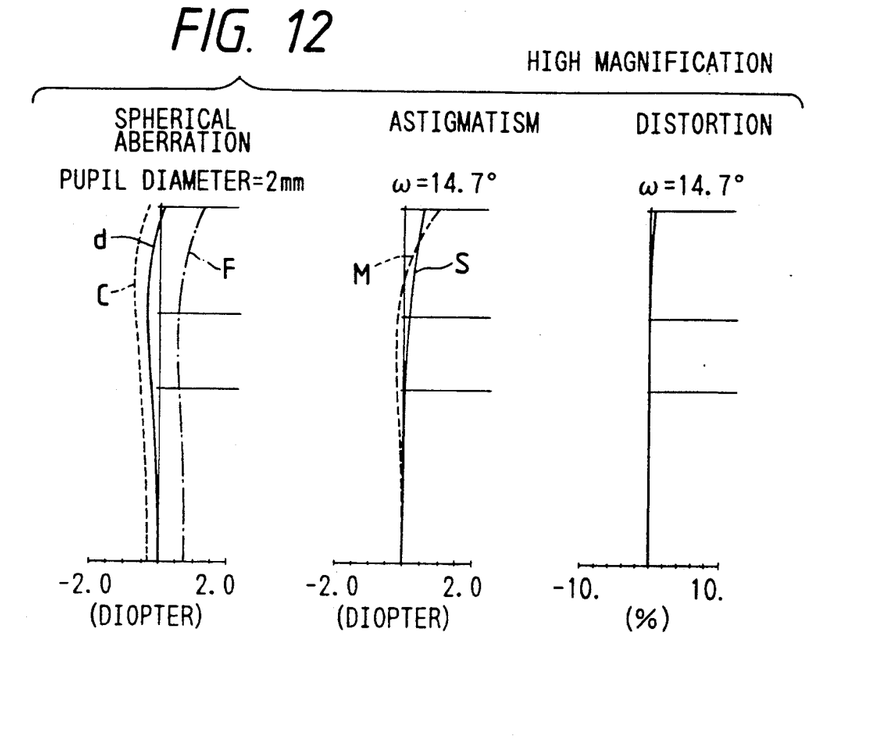

FIGS. 8 to 12 show a second embodiment of the present invention. In FIG. 8, a pentagonal prism 16 is disposed behind the second lens unit 6 and also used as the third lens unit by configuring a plane of incidence 16a of the beam of light into a concave surface. Behind the prism 16, the Dach mirror 9 is disposed, and the field frame 13 and the field lens 12 are arranged, in order from the object side, between the pentagonal prism 16 and the Dach mirror 9.

Since this arrangement does away with the need for the third lens unit, the space and cost can be reduced accordingly and further downsizing of the camera is accomplished.

The numerical data of the second embodiment are as follows:

Finder magnification = 0.40~0.73
Field angle $(2\omega) = 55.3° \sim 29.3°$
$f_3/f_T = -2.78$

| | | | |
|---|---|---|---|
| $r_1 = -42.3175$ | | | |
| | $d_1 = 1.000$ | $n_1 = 1.58423$ | $\nu_1 = 30.49$ |
| $r_2 = 5.2759$ (aspherical) | | | |
| $r_3 = 7.7737$ | | | |
| | $d_2 = D_1$ | | |
| | $d_3 = 2.932$ | $n_2 = 1.49241$ | $\nu_2 = 57.66$ |
| $r_4 = -8.0406$ (aspherical) | | | |
| | $d_4 = D_2$ | | |
| $r_5 = -24.9060$ (aspherical) | | | |
| | $d_5 = 29.000$ | $n_3 = 1.58423$ | $\nu_3 = 30.49$ |
| $r_6 = \infty$ | | | |
| | $d_6 = 1.000$ | | |
| $r_7 = 11.4530$ | | | |
| | $d_7 = 2.040$ | $n_4 = 1.49241$ | $\nu_4 = 57.66$ |
| $r_8 = \infty$ | | | |
| | $d_8 = 19.418$ | | |
| $r_9 = 11.4695$ (aspherical) | | | |
| | $d_9 = 2.567$ | $n_5 = 1.49241$ | $\nu_5 = 57.66$ |
| $r_{10} = -208.5849$ | | | |
| | $d_{10} = 20.000$ | | |
| $r_{11}$ (eyepoint) | | | |

Aspherical coefficients

Second surface
$A = 0.61011 \times 10^{-4}$, $B = -0.48497 \times 10^{-4}$,
$C = 0.52489 \times 10^{-6}$
Fourth surface
$A = 0.70968 \times 10^{-3}$, $B = 0.87197 \times 10^{-5}$,
$C = -0.25680 \times 10^{-6}$
Fifth surface
$A = -0.43545 \times 10^{-3}$, $B = 0.11683 \times 10^{-4}$,
$C = 0.17403 \times 10^{-5}$
Ninth surface
$A = -0.11459 \times 10^{-3}$, $B = -0.54677 \times 10^{-6}$,
$C = -0.25638 \times 10^{-8}$ Zoom data

| | Low magnification | Moderate magnification | High magnification |
|---|---|---|---|
| $D_1$ | 11.068 | 8.225 | 5.827 |
| $D_2$ | 1.000 | 3.061 | 6.242 |
| $\beta_2$ | -0.738 | -0.978 | -1.348 |

Figure 13:
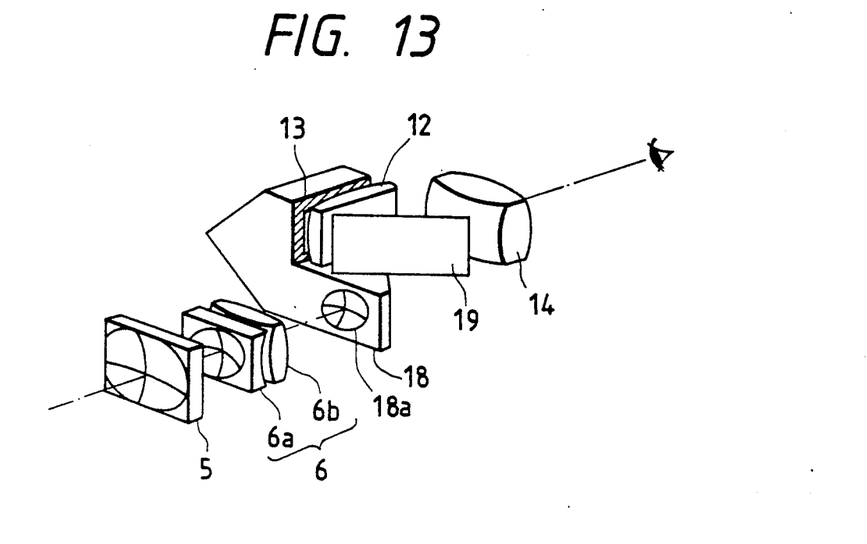
FIG. 13 is a view showing the arrangement of the finder optical system of a third embodiment.
Figure 14A:
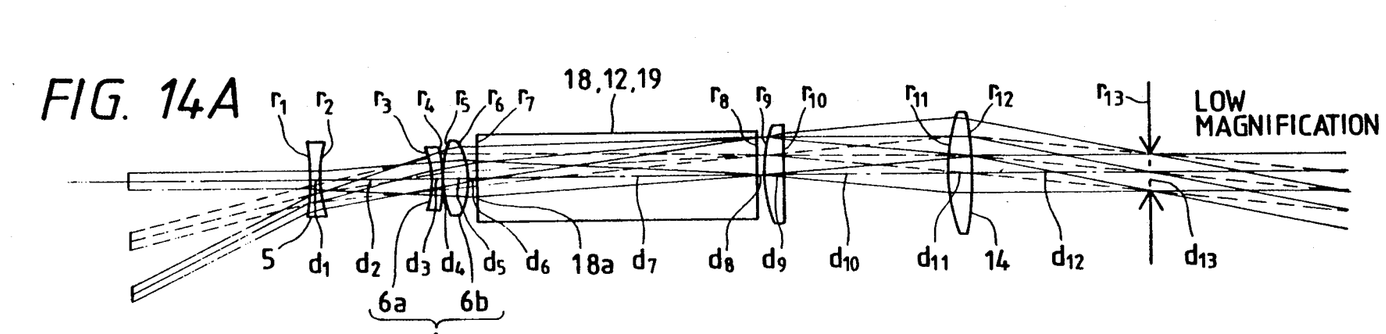
FIGS. 14A to 14C are developed view in the direction of the optical axis of the finder optical system in FIG. 13 at low, moderate, and high magnifications, respectively.
Figure 14B:
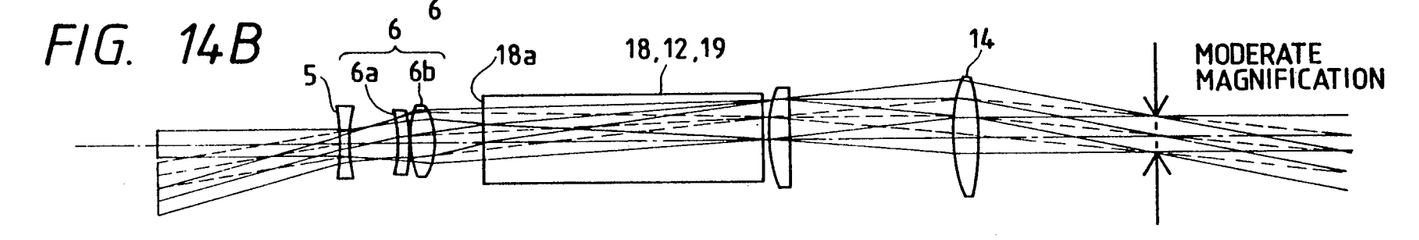
Figure 14C:
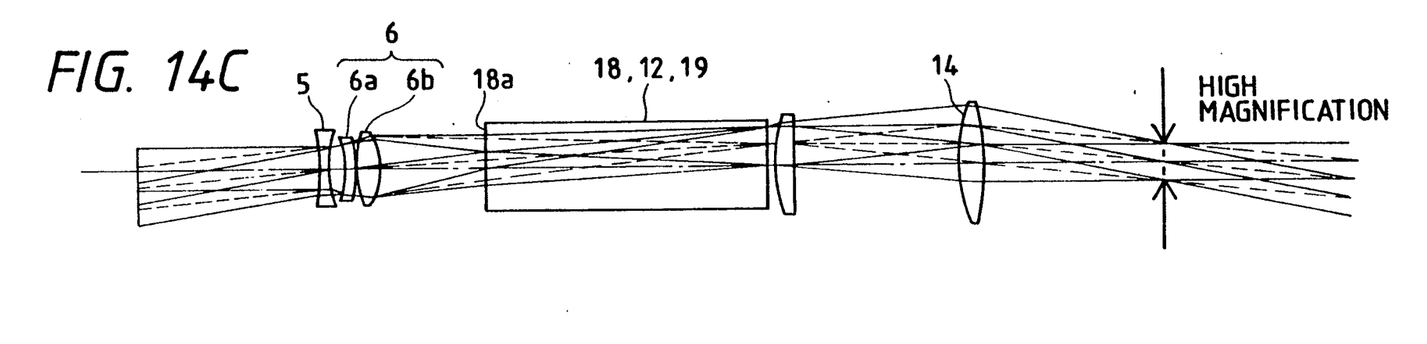
Figure 15:
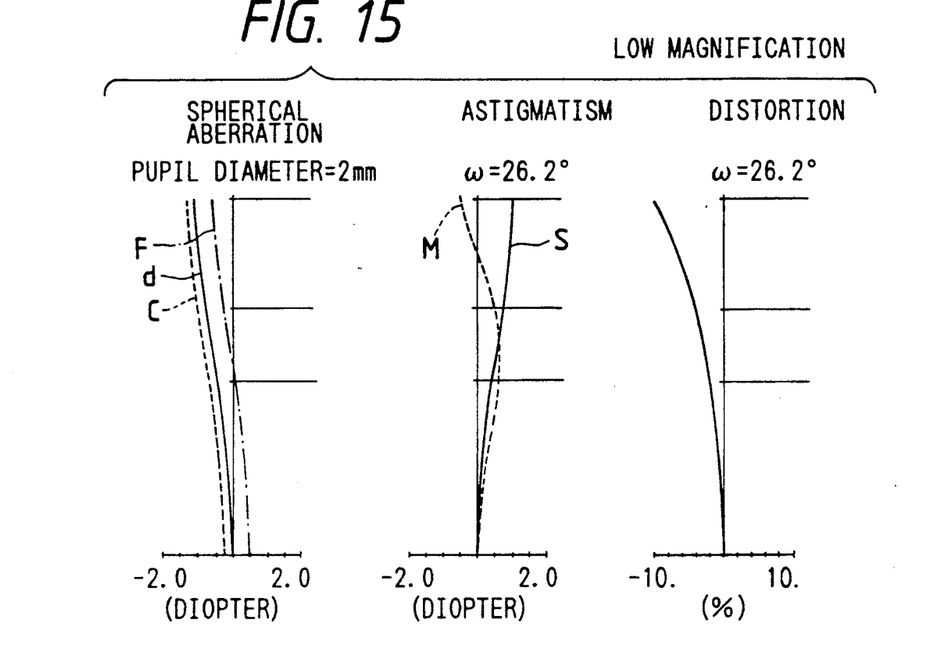
FIGS. 15 to 17 are diagrams showing aberration curves of the optical system of the third embodiment at low, moderate, and high magnifications, respectively.
Figure 16:
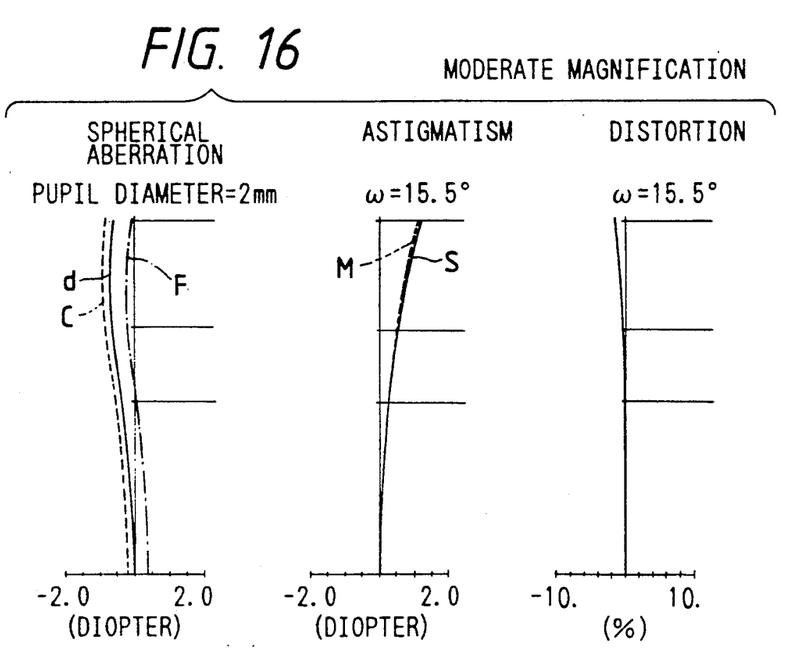
Figure 17:
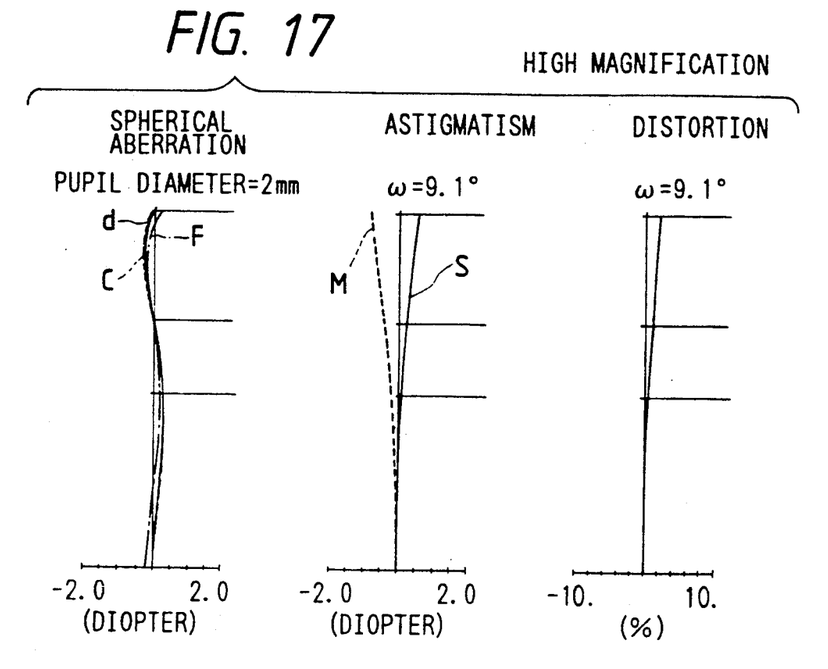
Figure 18A:
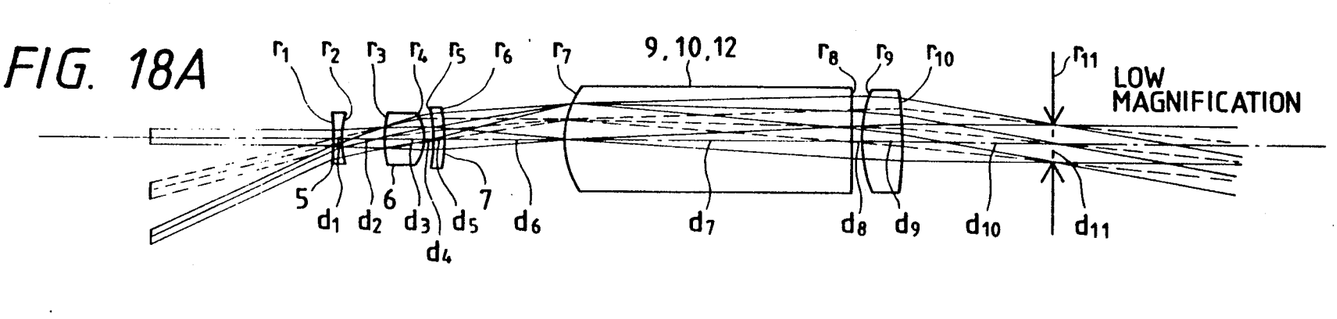
FIGS. 18A to 18C are developed views in the direction of the optical axis of the finder optical system of a fourth embodiment at low, moderate, and high magnifications, respectively.
Figure 18B:
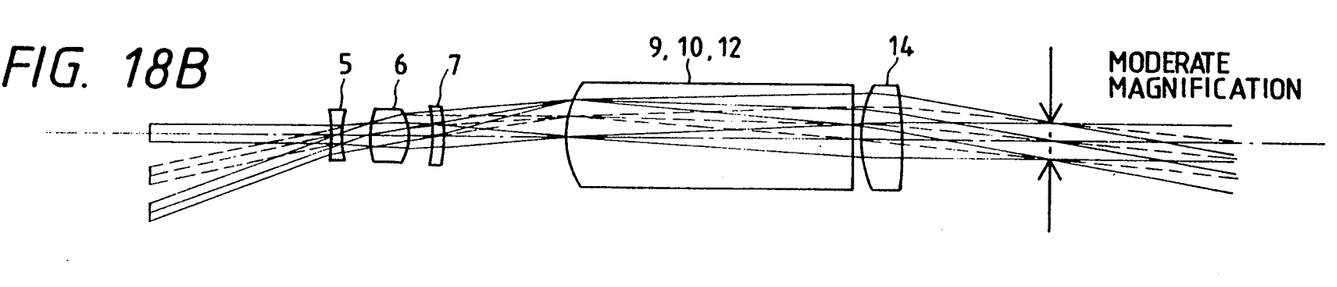
Figure 18C:
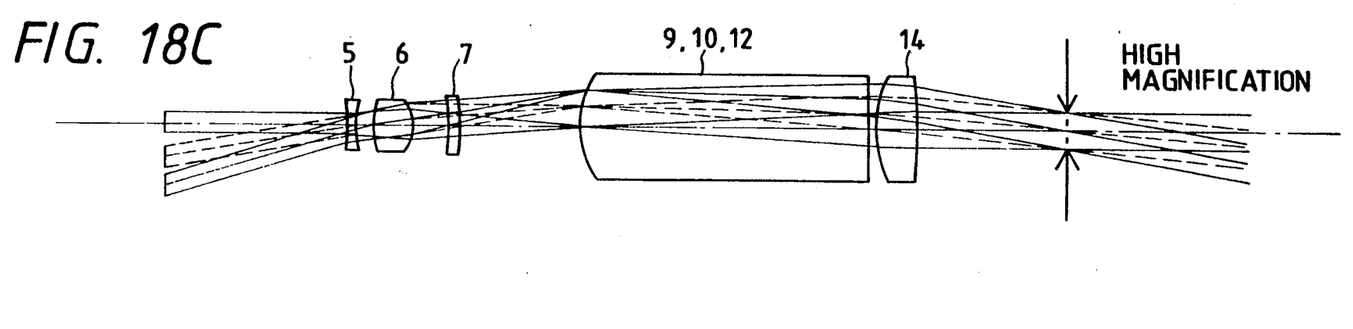
Figure 19:
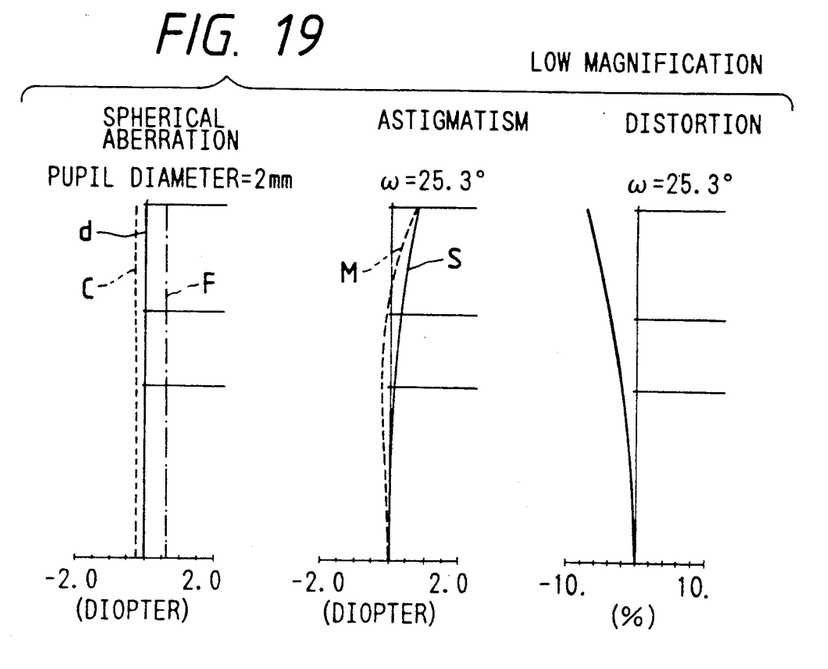
FIGS. 19 to 21 are diagrams showing aberration curves of the optical system of the fourth embodiment at low, moderate, and high magnifications, respectively.
Figure 20:
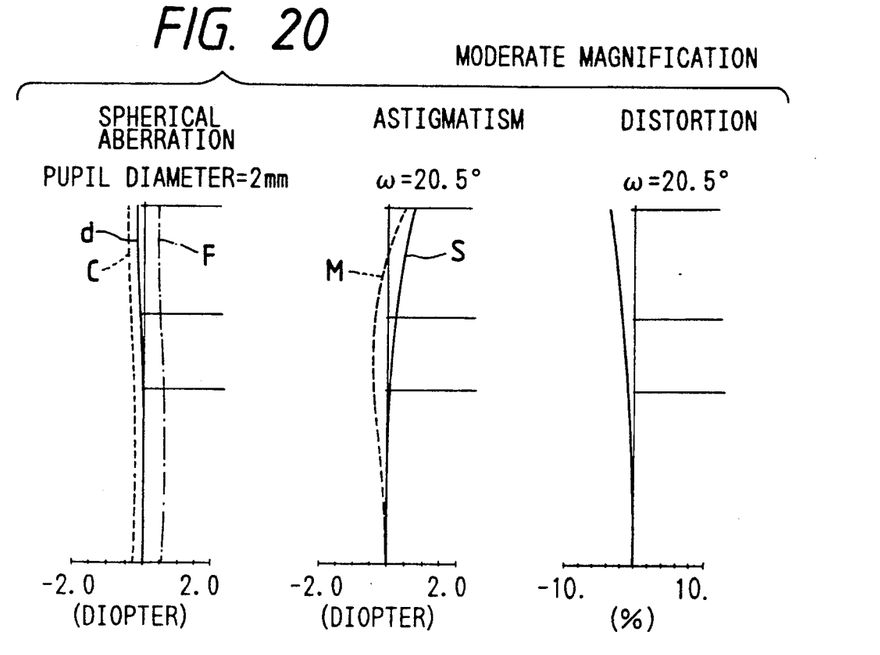
Figure 21:
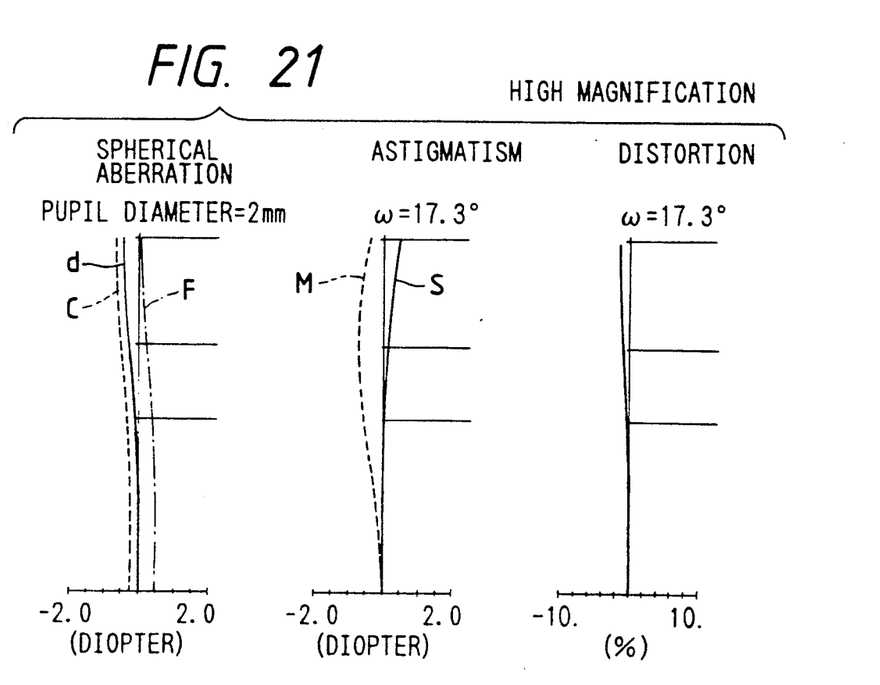

FIGS. 13 to 17 show a third embodiment of the present invention. In FIG. 13, the second lens unit 6 comprises a negative lens 6a and a positive lens 6b and has positive refracting power as a whole. Behind the second lens unit 6, a Porro prism 18 is disposed in which a plane of incidence 18a is configured into a concave surface and the light beam is reflected thrice. Further, a planar mirror 19 for bending the light beam toward the Lupe 14 is disposed behind the field frame 13 and the field lens 12.

The numerical data of the third embodiment are as follows:

Finder magnification = 0.45~1.15
Field angle $(2\omega) = 52.4° \sim 19.2°$
$f_3/f_T = -4.90$

| | | | |
|---|---|---|---|
| $r_1 = -19.1577$ | | | |
| | $d_1 = 1.000$ | $n_1 = 1.58423$ | $\nu_1 = 30.49$ |
| $r_2 = 12.9702$ (aspherical) | | | |
| | $d_2 = D_1$ | | |
| $r_3 = -7.7070$ | | | |
| | $d_3 = 1.091$ | $n_2 = 1.58423$ | $\nu_2 = 30.49$ |
| $r_4 = -12.5496$ | | | |
| | $d_4 = 0.100$ | | |
| $r_5 = 9.4528$ (aspherical) | | | |
| | $d_5 = 2.558$ | $n_3 = 1.49241$ | $\nu_3 = 57.66$ |
| $r_6 = -7.6280$ | | | |
| | $d_6 = D_2$ | | |
| $r_7 = -69.1753$ (aspherical) | | | |

-continued

| | | | |
|---|---|---|---|
| | $d_7 = 30.391$ | $n_4 = 1.58423$ | $\nu_4 = 30.49$ |
| $r_8 = \infty$ | | | |
| | $d_8 = 1.000$ | | |
| $r_9 = 16.3132$ | | | |
| | $d_9 = 2.000$ | $n_5 = 1.49241$ | $\nu_5 = 57.66$ |
| $r_{10} = \infty$ | | | |
| | $d_{10} = 18.350$ | | |
| $r_{11} = 19.0196$ | | | |
| | $d_{11} = 2.760$ | $n_6 = 1.49241$ | $\nu_6 = 57.66$ |
| $r_{12} = -23.4716$ (aspherical) | | | |
| | $d_{12} = 19.492$ | | |
| $r_{13}$ (eyepoint) | | | |

Aspherical coefficients

Second surface
$A = -0.67323 \times 10^{-3}$, $B = 0.91037 \times 10^4$,
$C = -0.45416 \times 10^{-5}$
Fifth surface
$A = -0.11046 \times 10^{-2}$, $B = 0.17146 \times 10^{-4}$,
$C = -0.16465 \times 10^{-6}$
Seventh surface
$A = -0.16132 \times 10^{-3}$, $B = 0.15206 \times 10^{-4}$,
$C = -0.57595 \times 10^{-6}$
Twelfth surface
$A = 0.49226 \times 10^{-4}$, $B = 0.11263 \times 10^{-5}$,
$C = -0.16790 \times 10^{-7}$ Zoom data

| | Low magnification | Moderate magnification | High magnification |
|---|---|---|---|
| $D_1$ | 12.251 | 5.619 | 1.725 |
| $D_2$ | 1.000 | 5.193 | 11.527 |
| $\beta_2$ | −0.622 | −1.009 | −1.590 |

FIGS. 18 to 21 show a fourth embodiment of the present invention. The basic arrangement of the real image mode variable magnification finder optical system according to this embodiment is substantially the same as that of the first embodiment (refer to FIG. 3), and hence the corresponding drawing is omitted. In the fourth embodiment, the first lens unit 5 is fixedly disposed. This reason is that since the variable magnification ratio in the fourth embodiment is relatively low as seen from the following data, the amount of diopter shift caused in varying magnification is small, and such a degree of diopter shift is within a range adjustable with an observer's eye, so that there is no problem in practical use even though the first lens unit 5 is not moved for diopter correction. Thus, by disposing fixedly the first lens unit 5, a movable lens mechanism can be eliminated and the cost can also be reduced.

The numerical data of the fourth embodiment are as follows:

| | | | |
|---|---|---|---|
| Finder magnification = 0.4~0.57 | | | |
| Field angle (2ω) = 50.5°~34.5° | | | |
| $f_3/f_T = -34.15$ | | | |
| $r_1 = -23.8275$ | | | |
| | $d_1 = 1.000$ | $n_1 = 1.58423$ | $\nu_1 = 30.49$ |
| $r_2 = 8.1837$ (aspherical) | | | |
| | $d_2 = D_1$ | | |
| $r_3 = 17.8120$ (aspherical) | | | |
| | $d_3 = 3.938$ | $n_2 = 1.49241$ | $\nu_2 = 57.66$ |
| $r_4 = -4.6894$ | | | |
| | $d_4 = D_2$ | | |
| $r_5 = -15.9557$ (aspherical) | | | |
| | $d_5 = 1.120$ | $n_3 = 1.58423$ | $\nu_3 = 30.49$ |

-continued

| | | | |
|---|---|---|---|
| $r_6 = -17.4475$ | | | |
| | $d_6 = 13.230$ | | |
| $r_7 = 10.3382$ (aspherical) | | | |
| | $d_7 = 31.273$ | $n_4 = 1.49241$ | $\nu_4 = 57.66$ |
| $r_8 = \infty$ | | | |
| | $d_8 = 1.190$ | | |
| $r_9 = 14.0700$ (aspherical) | | | |
| | $d_9 = 4.000$ | $n_5 = 1.49241$ | $\nu_5 = 57.66$ |
| $r_{10} = -52.4290$ | | | |
| | $d_{10} = 16.500$ | | |
| $r_{11}$ (eyepoint) | | | |

Aspherical coefficients

Second surface
$A = 0.16401 \times 10^{-3}$, $B = -0.34100 \times 10^{-3}$,
$C = 0.82078 \times 10^{-4}$
Third surface
$A = -0.23287 \times 10^{-2}$, $B = -0.36832 \times 10^{-3}$,
$C = 0.76308 \times 10^{-4}$
Fifth surface
$A = -0.90322 \times 10^{-4}$, $B = 0.35738 \times 10^{-4}$,
$C = -0.16914 \times 10^{-5}$
Seventh surface
$A = 0.93799 \times 10^{-4}$, $B = -0.62781 \times 10^{-6}$,
$C = -0.18706 \times 10^{-6}$
Ninth surface
$A = -0.10415 \times 10^{-3}$, $B = 0.37058 \times 10^{-6}$,
$C = -0.12658 \times 10^{-7}$ Zoom data

| | Low magnification | Moderate magnification | High magnification |
|---|---|---|---|
| $D_1$ | 4.911 | 3.353 | 2.049 |
| $D_2$ | 0.970 | 2.528 | 3.832 |
| $\beta_2$ | −0.834 | −0.996 | −1.118 |

Here, in each of the above embodiments, reference symbols $r_1$, $r_2$, ... represents radii of curvature of individual lens surfaces; $d_1$, $d_2$, ... thicknesses of individual lenses or spaces therebetween; $n_1$, $n_2$, ... refractive indices of individual lenses; and $\nu_1$, $\nu_2$, ... Abbe's numbers of individual lenses.

Also, the configurations of the aspherical surfaces in each embodiment are expressed by the following equation using the aspherical coefficients:

$$Z = \{(Y^2/r)/(1 + \sqrt{1 - (Y^2/r^2)})\} + AY^4 + BY^6 + CY^8$$

where Z represents the coordinates in the direction of the optical axis, Y the coordinates in the direction normal to the optical axis, r the paraxial radius of curvature, and A, B, and C aspherical coefficients.

The optical elements in each embodiment, although made of plastic with the intention of reducing their costs, may be constructed of glass if the costs are put on a commercial basis. The eyepiece system is constructed from a field lens or prism and a positive lens for cost reduction and space saving, but this positive lens may be used as two lens components of a negative lens plus a positive lens, if cost and space permit. Thus, it is needless to say that the optical performance is further improved with great ease.

What is claimed is:

1. A real image mode variable magnification finder optical system comprising: in order from an object side, an objective lens system including a first lens unit of negative refracting power, a second lens unit of positive refracting power, and a third lens unit of negative refracting power, provided with positive refracting power as a whole;

an image erecting optical system having a plurality of reflecting surfaces, for erecting an object image formed by said objective lens system; and an eyepiece system having positive refracting power, for observing the object image erected by said image erecting optical system, wherein a distance between said first lens unit and said second lens unit is changed together with a distance between said second lens unit and said third lens unit, and said third lens unit is fixed to vary magnification.

2. A real image mode variable magnification finder optical system comprising: in order from an object side, an objective lens system including a first lens unit of negative refracting power, a second lens unit of positive refracting power, and a third lens unit of negative refracting power, provided with positive refracting power as a whole;

an image erecting optical system having a plurality of reflecting surfaces, for erecting an object image formed by said objective lens system; and an eyepiece system having positive refracting power, for observing the object image erected by said image erecting optical system, wherein said second lens unit is moved along an optical axis and said third lens unit is fixed on the optical axis to vary magnification.

3. The finder optical system according to either of claims 1 or 2, wherein said first lens unit is moved along an optical axis in varying magnification.

4. The finder optical system according to either of claims 1 or 2, wherein at least one reflecting surface is provided between a surface of said third lens unit closest to the object, and said object.

5. The finder optical system according to either of claims 1 or 2, wherein said second lens unit is moved toward the object over a range from a wide angle to a tele angle in varying magnification.

* * * * *